(12) United States Patent
Meyer (10) Patent No.: US 6,976,794 B1
(45) Date of Patent: Dec. 20, 2005

(54) METHOD AND APPARATUS FOR READING, DISPLAYING, TRANSMITTING AND USING DATA OBTAINED FROM OPTICAL MODULES

(76) Inventor: Bruce A. Meyer, 282 Central Ave., P.O. Box 1160, Mountainside, NJ (US) 07092

( * ) Notice: Subject to any disclaimer, the term of this patent is extended or adjusted under 35 U.S.C. 154(b) by 0 days.

(21) Appl. No.: 10/896,825

(22) Filed: Jul. 22, 2004

Related U.S. Application Data (60) Provisional application No. 60/490,241, filed on Jul. 23, 2003.

(51) Int. Cl.[7] ................................................ G02B 6/36
(52) U.S. Cl. .......................................... 385/88; 385/92
(58) Field of Search ................ 235/462.43; 385/88–94, 385/15, 139; 361/728, 752; 439/567, 607

(56) References Cited

U.S. PATENT DOCUMENTS

| | | | |
|---|---|---|---|
| 6,524,134 B2 * | 2/2003 | Flickinger et al. | 439/607 |
| 6,771,511 B2 * | 8/2004 | Bui | 361/728 |
| 6,863,448 B2 * | 3/2005 | Chiu et al. | 385/88 |

* cited by examiner

*Primary Examiner*—Thien M. Le
*Assistant Examiner*—April Taylor
(74) *Attorney, Agent, or Firm*—Straub & Pokotylo; Michael P. Straub (57) ABSTRACT

The present invention is directed to methods and an apparatus for reading, displaying, and transmitting data obtained from Small Form-factor Pluggable (SFP) optical modules and 10 Gigabit Small Form-factor Pluggable (XFP) optical modules, as well as other type of optical modules. In accordance with one exemplary embodiment of the invention, a small handheld unit including an LCD (liquid crystal display) panel, an electrical interface circuit, a battery, and a user-operated switch, is used to interrogate an inserted optical module.

23 Claims, 11 Drawing Sheets

PRIOR ART

FRONT VIEW

| Descriptive Information | Screen # | Example |
|---|---|---|
| Vendor Name<br>Part Number | Screen 1<br>950 | Agilent<br>NFBR-5701L |
| Serial Number<br>Revision | Screen 2<br>952 | 0115094455260261<br>Revision: [01] |
| Type Rate<br>Encoding | Screen 3<br>954 | GbE-SX I/SN<br>12–Mb/s 8B10B |
| Range Data 1<br>Range Data 2 | Screen 4<br>956 | 50u 200M<br>62u 300M |
| Mfg Date, Lot No.<br>Checksums | Screen 5<br>958 | 12/09/2001 Lot00<br>Checksums: OK/OK |

METHOD AND APPARATUS FOR READING, DISPLAYING, TRANSMITTING AND USING DATA OBTAINED FROM OPTICAL MODULES

RELATED APPLICATIONS

The present application claims the benefit of the filing date of U.S. Provisional Patent Application Ser. No. 60/490,241 filed Jul. 23, 2003, titled "METHOD AND APPARATUS FOR READING, DISPLAYING, TRANSMITTING AND USING DATA OBTAINED FROM OPTICAL MODULES", which is hereby expressly incorporated by reference.

FIELD OF THE INVENTION

The invention relates generally to the field of optical modules used in communications systems and other devices and, more particularly, to methods and apparatus for reading, displaying, transmitting and using data obtained from one or more optical modules and/or for generating a record of such information, e.g., as part of an optical module inventory.

BACKGROUND OF THE INVENTION

State of the art optical telecommunication and data communications systems often include elements that employ removable optical interface modules, which in turn provide configuration flexibility in terms of transmission rate, range, protocol, and so forth as well as improved serviceability. These modules, in general, are used in optical telecommunications and data communications equipment, to provide optical-to-electrical conversion of signals, and vice versa. Standardization of these optical modules within the telecommunications and data communications industries has resulted in a wide variety of these modules being available from many vendors and having markedly different operating capabilities while the modules themselves are of the same general size and shape when viewed from the outside. The characteristics of a given module, however, must be compatible with the application of the telecommunications equipment in which it is to be installed. Therefore it is very useful to have a priori knowledge of this compatibility in order to provision and continue telecommunications and data communications services. Moreover, it is useful to generate and maintain inventory control for modules that are stored as replacement spares.

Figure 1:
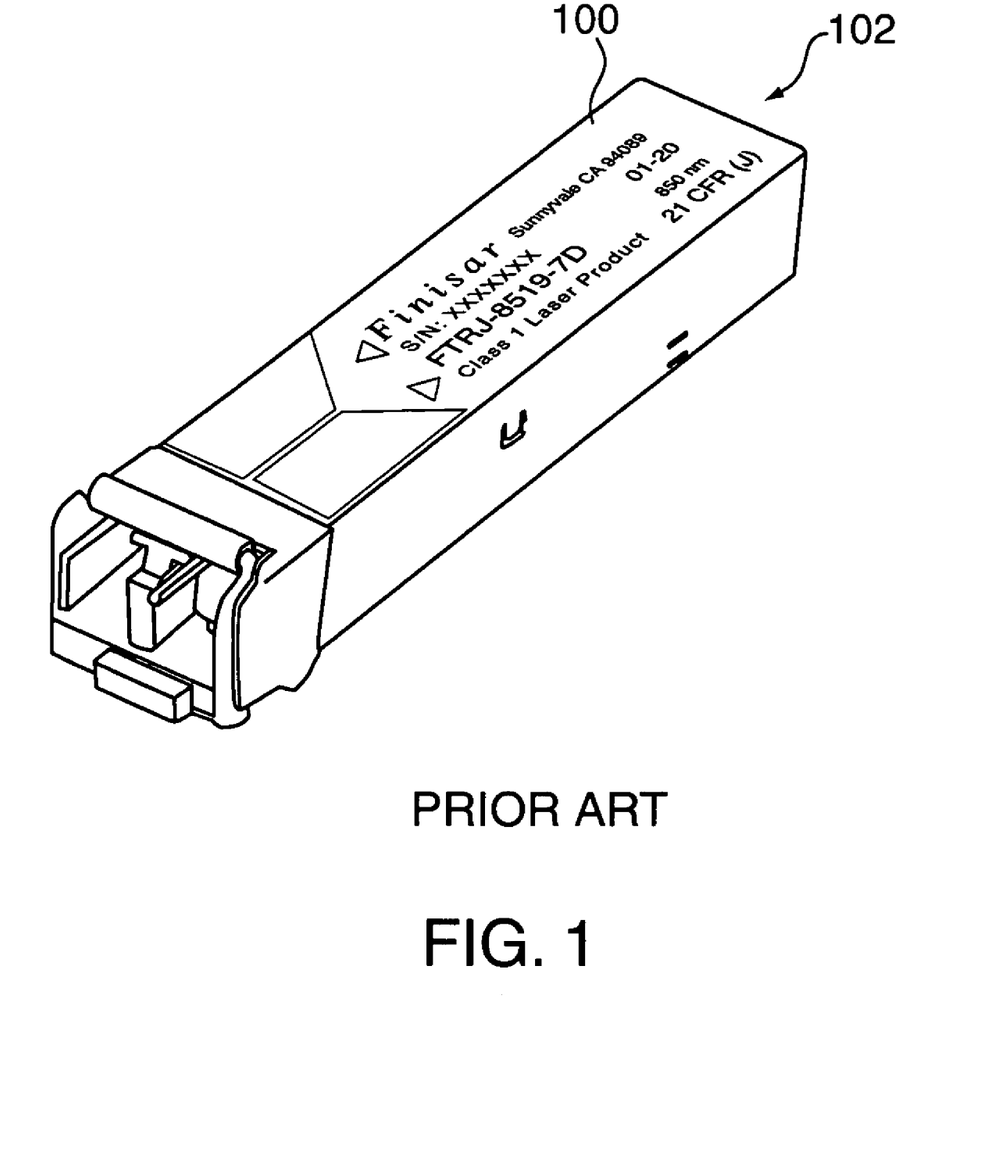
FIG. 1 illustrates an exemplary optical module.
Figure 2:
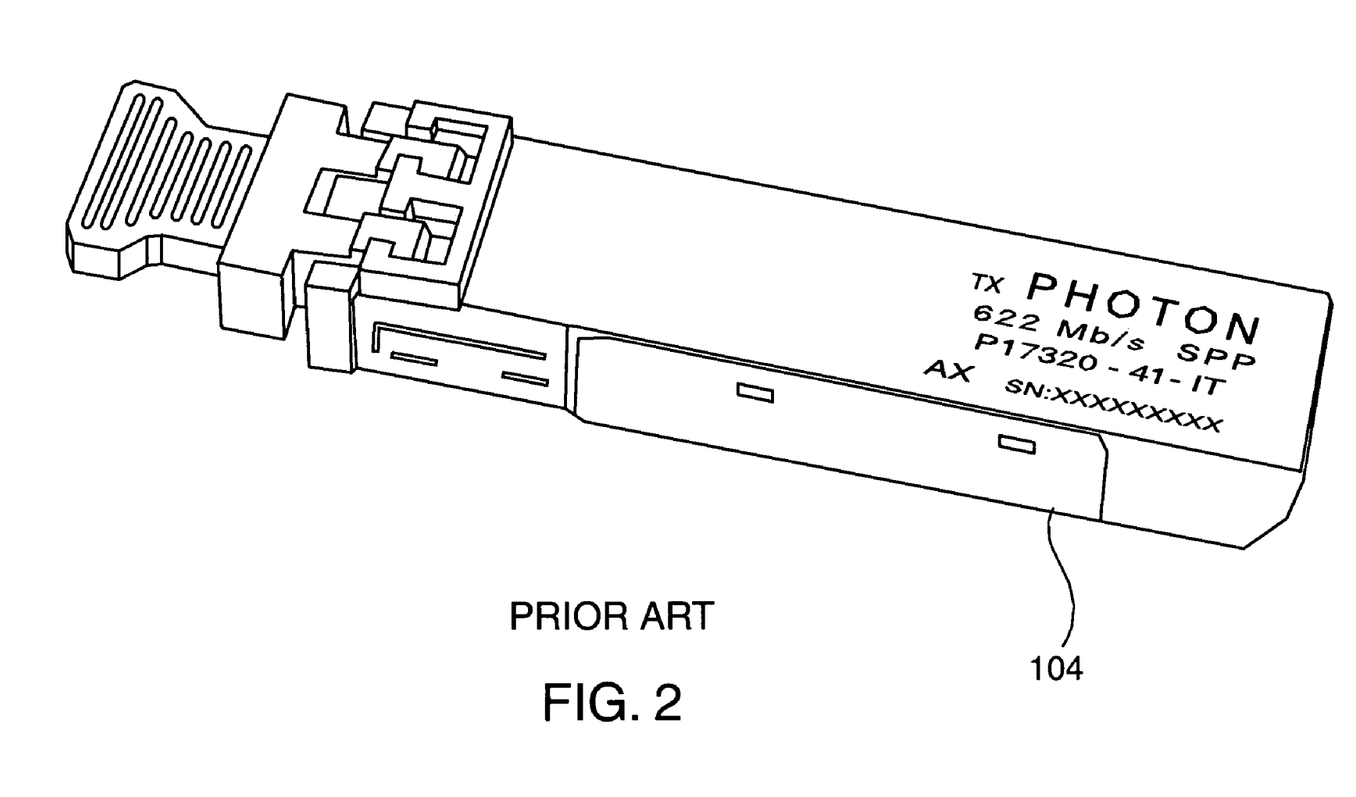
FIG. 2 illustrates another exemplary optical module.
Figure 3:
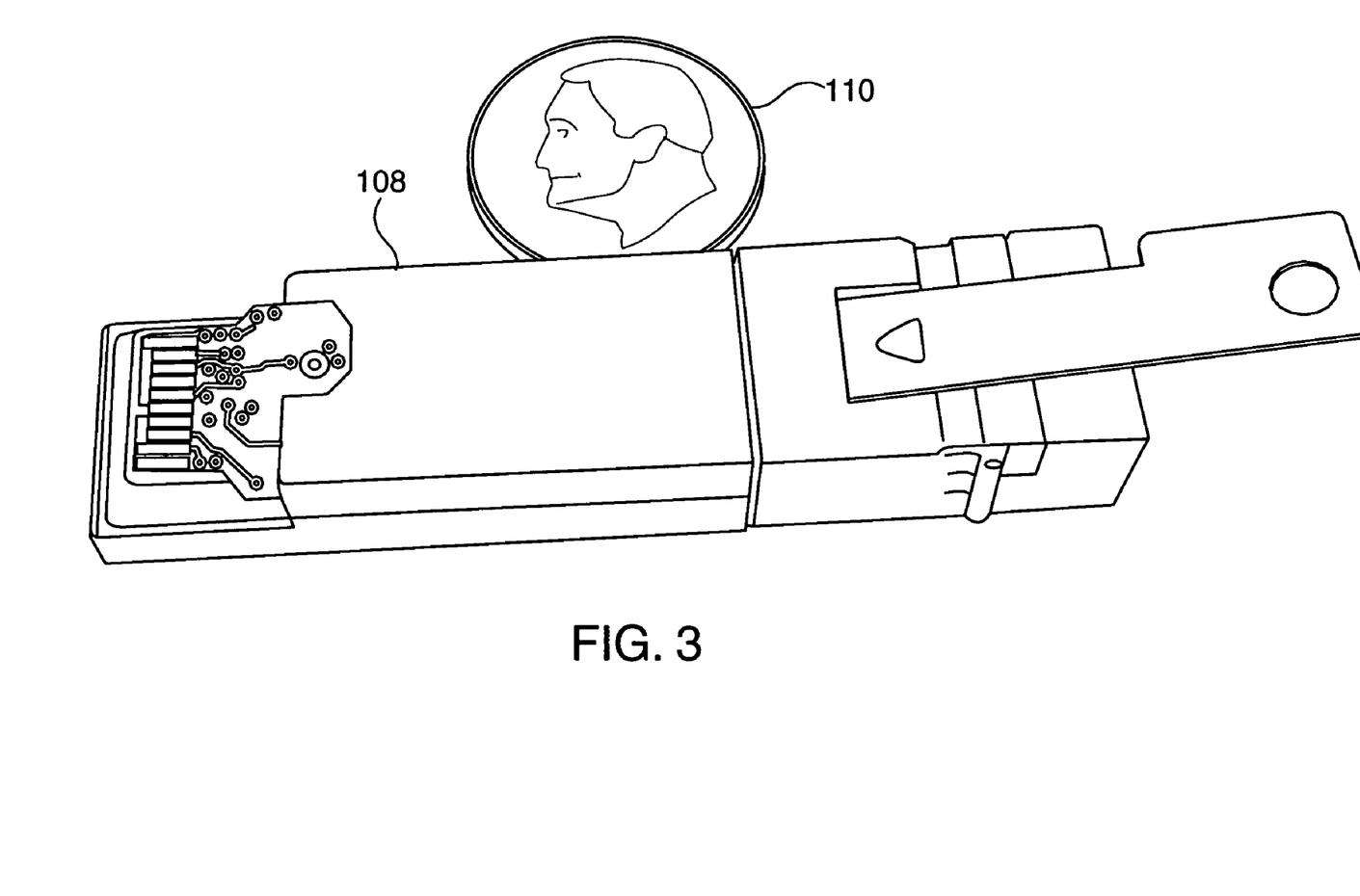
FIG. 3 illustrates a third exemplary optical module shown next to a dime to give a perspective of the actual size of such devices.

Due to the very small size of these modules, it is often not practical to list all relevant operating parameters on the exterior of the module housing. FIG. 1 illustrates a first exemplary optical module 100 with a limited amount of relatively small text 102 which can be difficult to read. FIG. 2 illustrates another exemplary optical module 104 with even less information printed thereon than the module of FIG. 1. FIG. 3 illustrates a third module 108 shown next to a dime 110 to give a perspective of the actual size of such devices.

Optical telecommunications and data communications systems generally require a cumbersome set of procedures and commands in order to retrieve and display characteristics of installed pluggable optical modules. These systems typically do not provide means to create and maintain an inventory of pluggable optical modules. Furthermore, due to the complexity of these optical telecommunications systems, it is not easy to perform the tasks necessary to obtain characteristic data from the pluggable optical modules. A simple mistake in entry of the cumbersome commands could result in serious undesired side effects including disruption of service to other customers.

In view of the above, it should be appreciated that there is a need for a better way and/or device for obtaining optical module information from existing modules. This is particularly important to field service people where insertion of the wrong optical module can be time consuming to detect and possibly harmful to the hardware being serviced. There is also a need for improved inventory control and methods and apparatus given the relatively high cost of such modules and the ease by which mistakes in identifying different modules based on the information printed thereon can occur. Furthermore, going to a service site with the wrong module or troubleshooting problems caused by use of a wrong module can be costly in terms of service technician time and downtime of the unit to be serviced.

SUMMARY OF THE INVENTION

The present invention is directed to methods and an apparatus for reading, displaying, and transmitting data obtained from Small Form-factor Pluggable (SFP) optical modules and 10 Gigabit Small Form-factor Pluggable (XFP) optical modules, as well as other types of optical modules. In accordance with one exemplary embodiment of the invention, a small handheld unit including an LCD (liquid crystal display) panel, an electrical interface circuit, a battery, and a user-operated switch, is used to interrogate an inserted optical module. Various characteristics of the inserted module are displayed on the LCD panel and optionally transmitted to an attached computer for non-volatile storage and further manipulation, e.g., printing.

The computer, which may be attached by a serial cable or other type of communications link to the portable optical module reader of the present invention, automatically adds or removes optical module information, obtained from optical modules inserted into the reader, from a database of optical module inventory information. During a first mode of operation, under direction of a program included in the memory of the computer, the computer adds optical module identification information read from each optical module inserted into the reader during the first mode of operation, to the database of optical module inventory information. During a second mode of operation, the computer removes optical module identification information obtained from each optical module inserted into the reader, from the database of optical module inventory information.

The first mode of operation corresponds to, e.g., adding modules to an inventory while the second mode corresponds to removing modules from an inventory.

The portable optical module reader of the present invention is light weight, e.g., under one pound in weight. In some embodiments the case is made of plastic and weighs less than 9 ounces. In other embodiments the total weight of the portable reader is under 6 ounces.

For cost and size reasons, a relatively small display, e.g., a display smaller than a conventional notebook computer display is used in various embodiments. The display may have a total area which is less than 25 square inches in size. In various embodiments, the display is less than 2.5"×4" in size.

For portability reasons the case is made, in various embodiments, of a durable plastic capable of withstanding being dropped on a concrete surface without breaking from a height of at least 3 feet. The housing includes a loop which can be used for attaching the portable reader to a belt clip or hook for suspending the device. The loop may be molded and formed at the time the housing is molded. In such cases, the loop is secured to the housing by the very same plastic which is used to form the housing. The housing may be small, e.g., less than 5"×5"×2.5" in size. Generally it is less than 6"×5"×4" in size.

For ease of use and from a cost perspective, in some embodiments a relatively small number of buttons are provided on the device, e.g., 5 or less, which the user can operate. In one embodiment a single button is provided. Operation of the button causes screens of displayed module information to change. The screens may ultimately be repeated as the various possible screens are viewed in sequence.

A serial or other type of computer interface port may be included in the portable device for supplying data read from optical modules to a computer system coupled thereto, e.g., by a serial cable.

While being described as being powered by a battery, solar power or other types of power may be, and sometimes are, used to power the portable device of the present invention.

Numerous additional features, embodiments and benefits of the methods and apparatus of the present invention are discussed below in the detailed description which follows.

DETAILED DESCRIPTION

Figure 4:
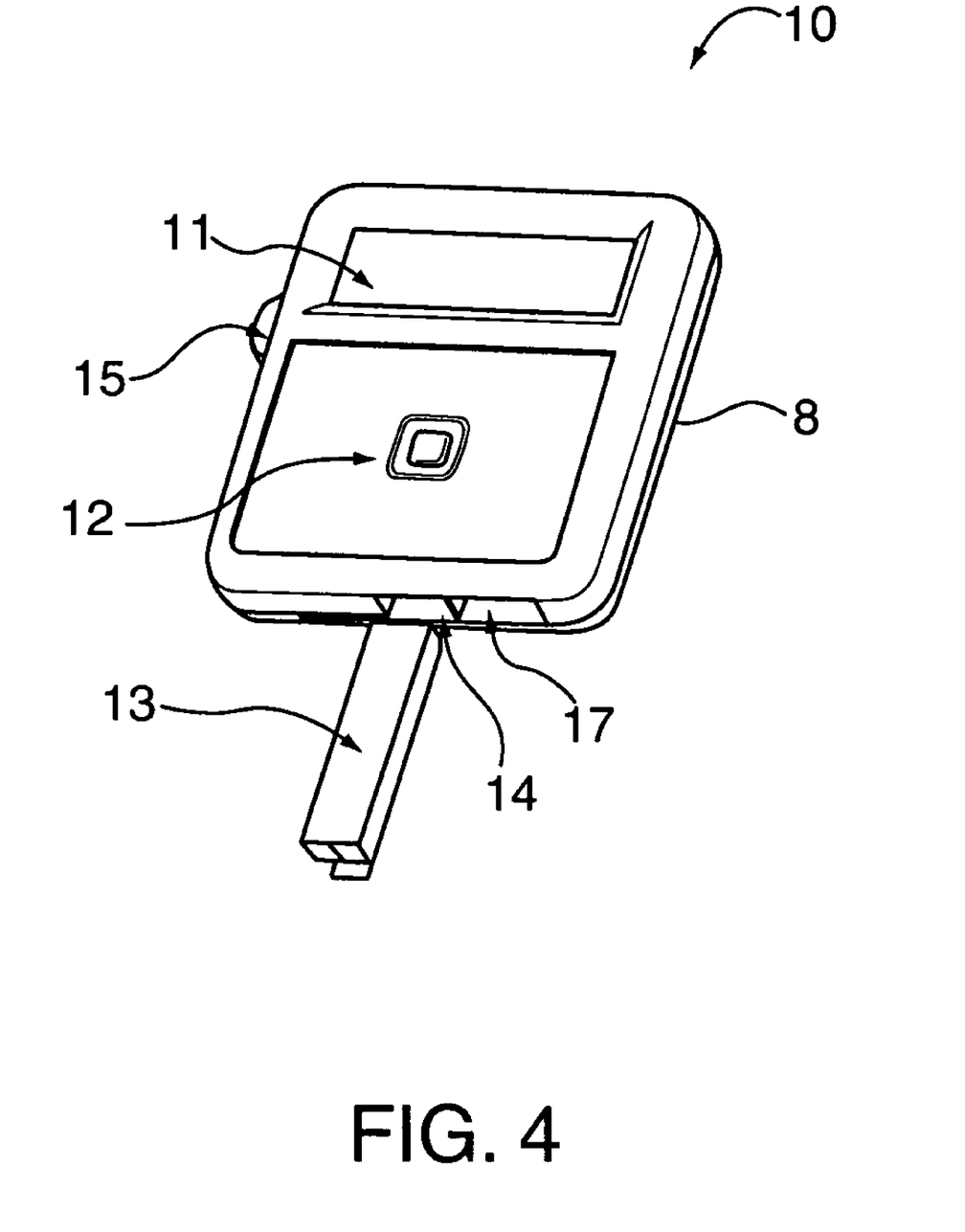
FIG. 4 illustrates the portable Optical Module Reader of the present invention and an exemplary optical module.

FIG. 4 shows a perspective view of an exemplary embodiment of a portable, lightweight, pluggable, Optical Module Reader 10, of the present invention, next to an exemplary pluggable Optical Module 13. Exemplary pluggable optical module 13 is illustrative of a typical SFP optical module. Optical Module Reader 10 includes a display screen 11, a user button 12, an SFP optical module receptacle 14, a XPF optical module receptacle 17, an attachment point 15, and a case 8. Display screen 11, may be, e.g, a LCD panel with a 2 line screen display, and is used to display operating instructions, module characteristics, warning messages, and other similarly related information. The user button 12 is depressed by the operator to change modes, cause additional data to be displayed, and signal other information. SFP optical module receptacle or socket 14 and XFP optical module receptacle or socket 17 accept industry standard SFP and XFP optical modules, respectively. Attachment point 15 is a loop formed in case 8 which provides a means for attaching the Optical Module Reader 10 to a lanyard or belt clip for user convenience.

Figure 5:
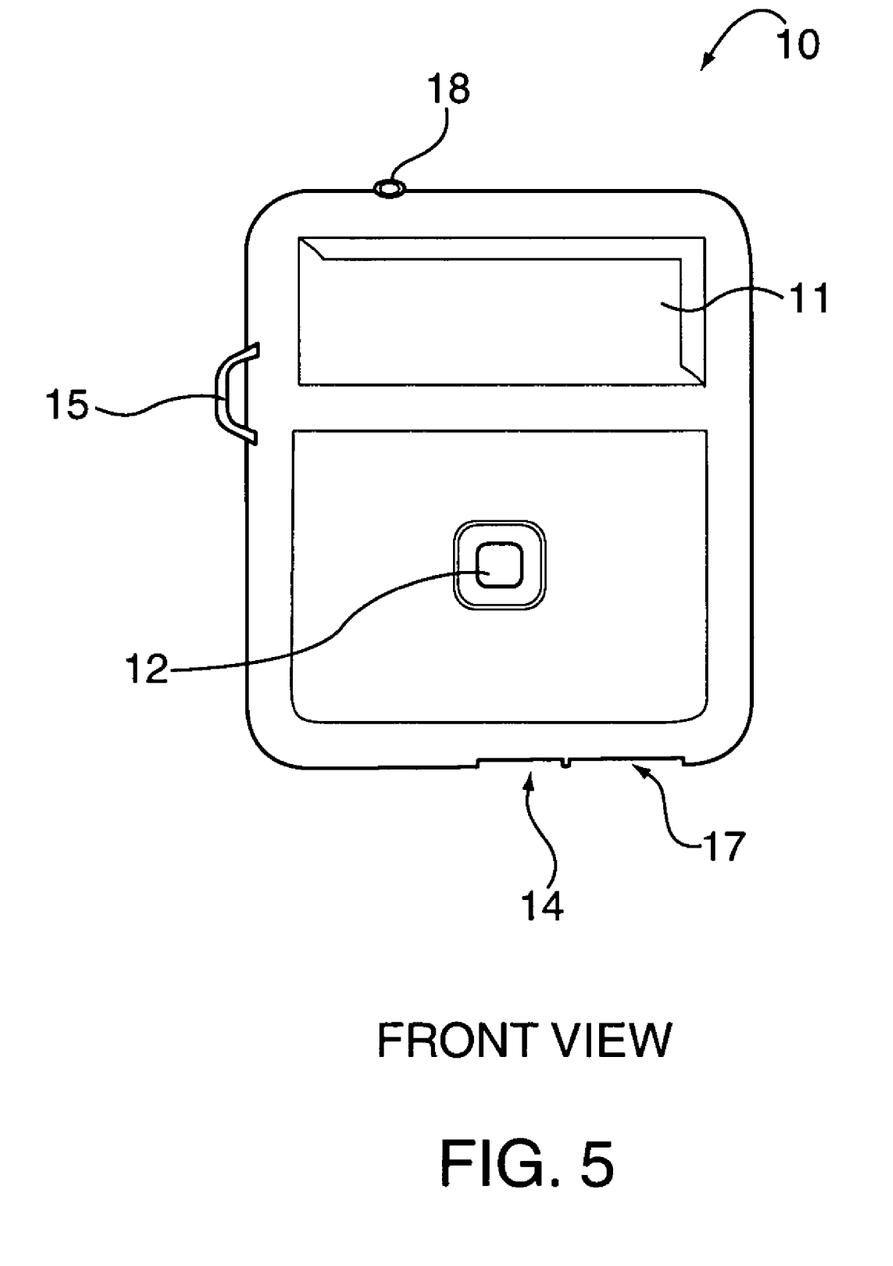
FIG. 5 shows a front view of the Optical Module Reader of FIG. 4.

FIG. 5 illustrates a front view of the Optical Module Reader 10 of FIG. 4. FIG. 5 shows that Optical Module Reader 10 also includes a serial interface port 18. The serial interface port 18 provides an interface to couple the Optical Module Reader 10 to a computer system which may be used for inventory purposes.

Figure 6:
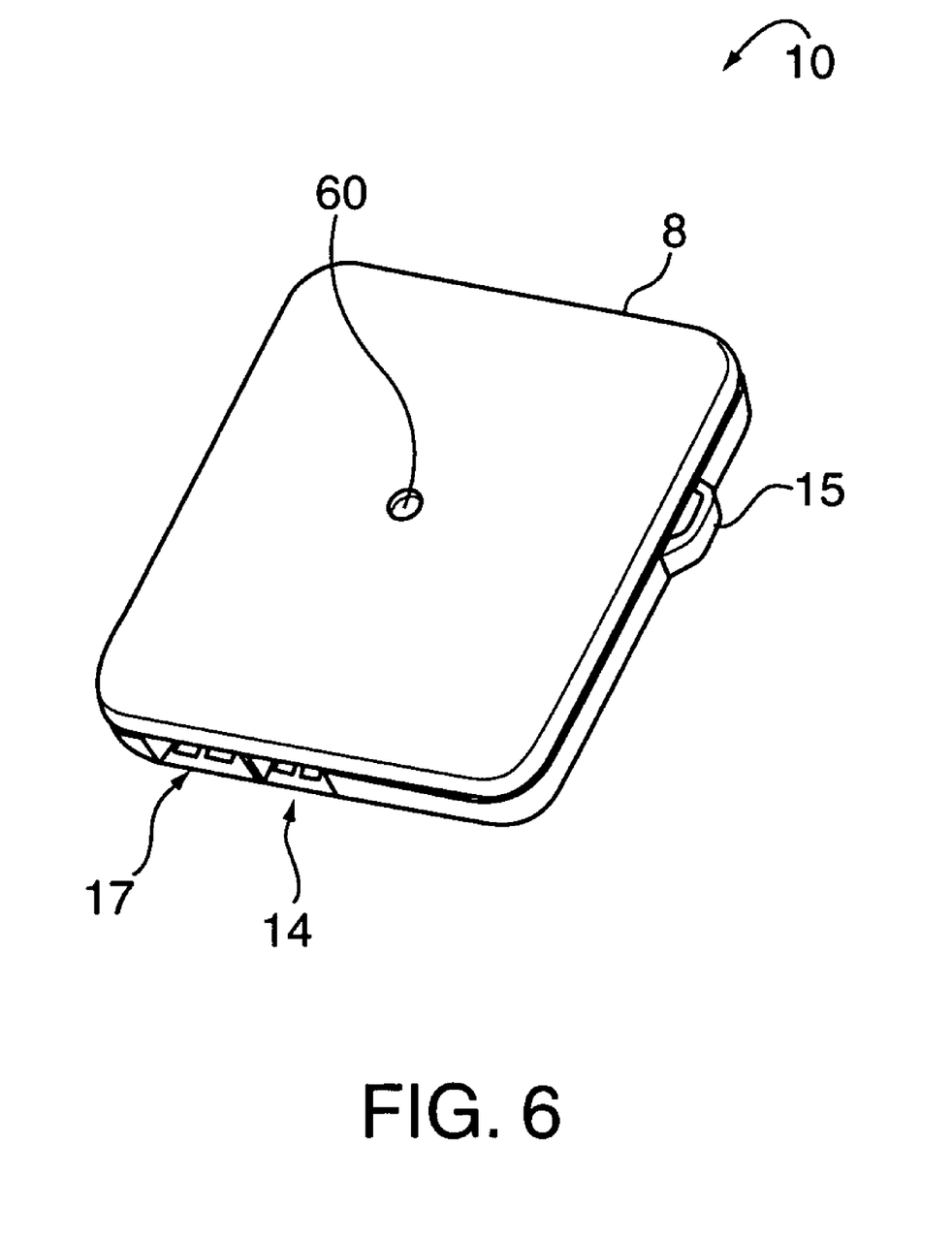
FIG. 6 shows a rear view of the Optical Module Reader of FIG. 4.

FIG. 6 illustrates a rear view of the Optical Module Reader 10 of FIG. 4. FIG. 6 shows that Optical Module Reader 10 also includes a back cover screw 60.

Figure 7:
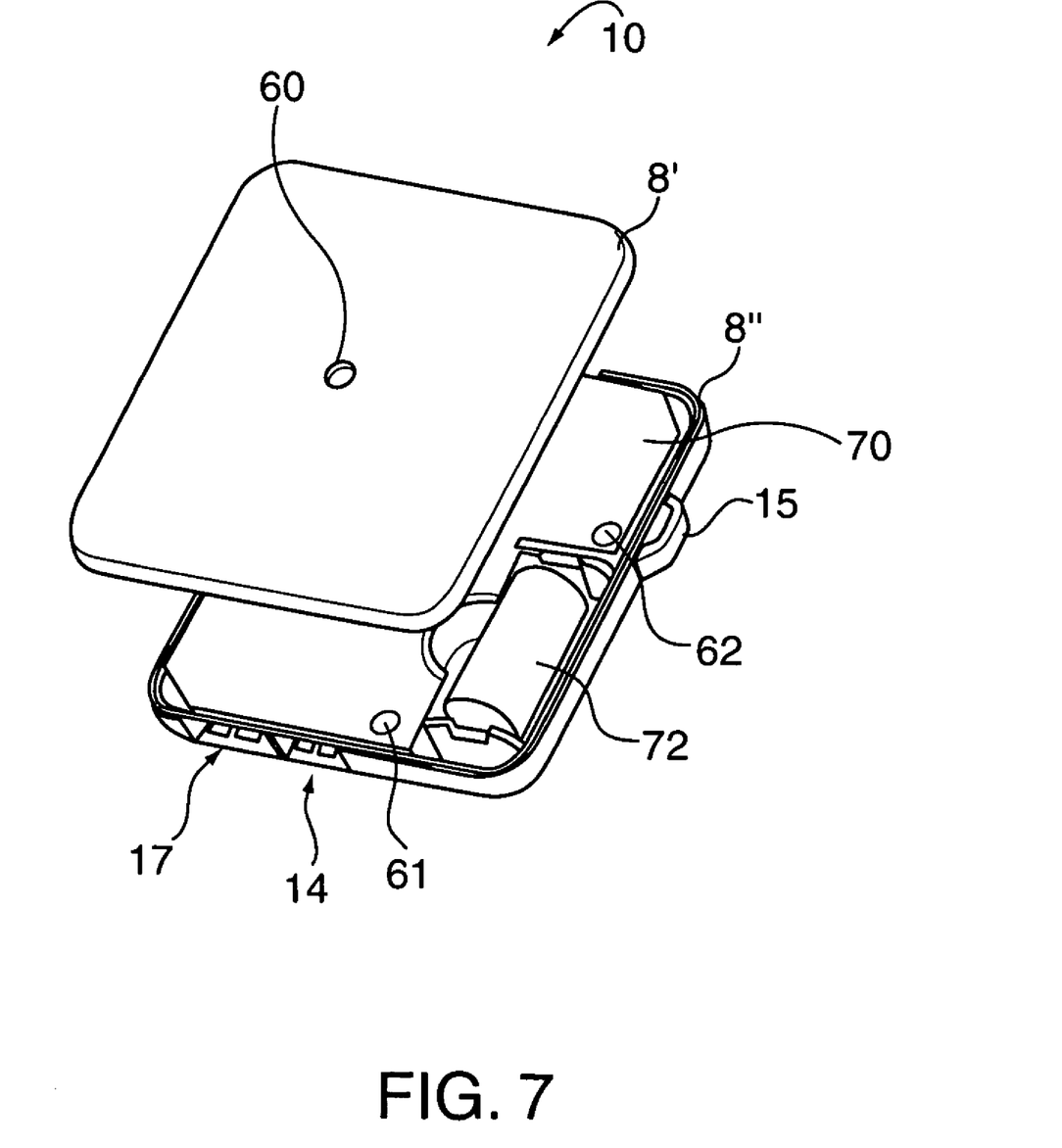
FIG. 7 shows a rear view of the Optical Module Reader of FIG. 4 with the back cover removed.

FIG. 7 illustrates another rear view of the Optical Module Reader 10 of FIG. 4. In FIG. 7, it may be seen the cover 8 includes a front cover portion 8" and a back cover portion 8'. In FIG. 7, back cover screw 60, which is used to secure the back cover 8' to device 10, has been removed exposing the inside of device 10, showing a battery 72, and a printed circuit board 70. Battery 72 is used to power the Optical Module Reader 10, and the battery 72 may be easily replaced, when required by removing the back cover 8'. Circuit board 70 is secured to the front portion of the case 8" by screws 61, 62. The circuit board 70 includes electronics, e.g. a microcontroller, RAM (Random Access Memory), and Flash ROM (Read Only Memory). Circuit board 70 includes circuitry that performs operations of the invention and implements methods of the present invention including, e.g., accessing the information stored in the optical devices which are plugged into the reader 10, processing input selections generated by the user, outputting onto display 11, and communicating with external computers through serial port 18 for providing inventory information and for other functions.

Figure 8:
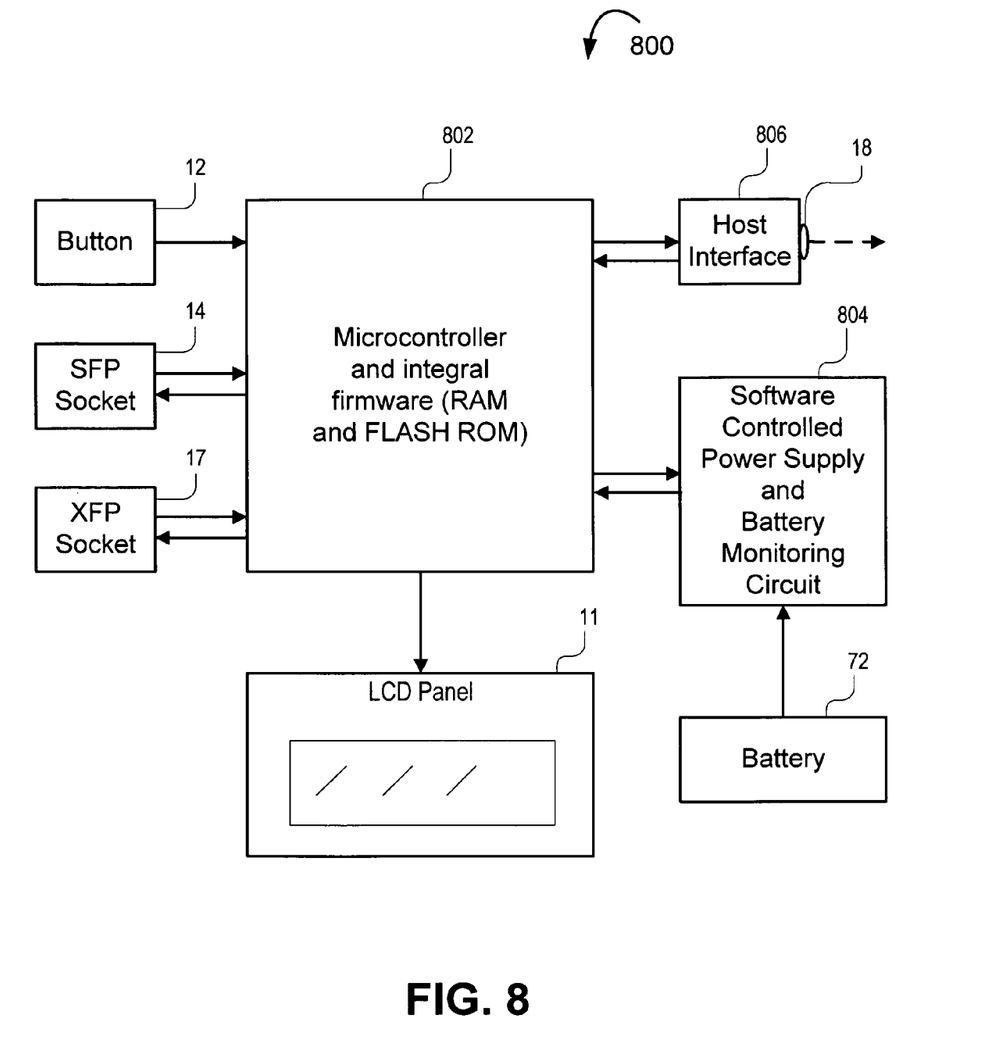
FIG. 8 shows a block diagram of the Optical Module Reader of FIG. 4.

FIG. 8 illustrates a block diagram 800 of the exemplary Optical Module Reader 10 of FIG. 4. Block diagram 800 includes a Microcontroller and integral firmware (RAM & FLASH ROM) 802, a software controlled power supply and battery monitoring circuit with battery connections 804, a Host interface 806 including serial interface port 18, button 12, SFP receptacle or socket 14, XFP receptacle or socket 17, a display 11, e.g., LCD panel, and battery 72. Microcontroller 802, central to the operation of the Optical Module Reader 10 and system, sends commands to and retrieves module data from SFP modules inserted into socket 14 or XFP modules inserted into socket 17, interprets the data, and subsequently formats and presents the data on the LCD panel 11. Optionally, module data is transmitted via the Host interface 806 through serial port 18 to a PC or other apparatus in the system. The user Button 12 provides an operator input capability to the microcontroller 802 and is used to select, signal, and otherwise convey user input. The battery 72 connects to the software controlled power supply 804 providing a power source for Optical Module Reader 10. Software controlled power supply 804 interfaces with microcontroller 802 in performing its operations. Software controlled power supply 804 supports voltage regulation/detection circuitry which controls and maintains operating power for the components 802, 806, 18, and 11 of the Optical Module Reader 10. Software controlled power supply 804 also supplies the power to SFP optical modules inserted into socket 14 or XFP modules inserted into socket 17.

Figure 9:
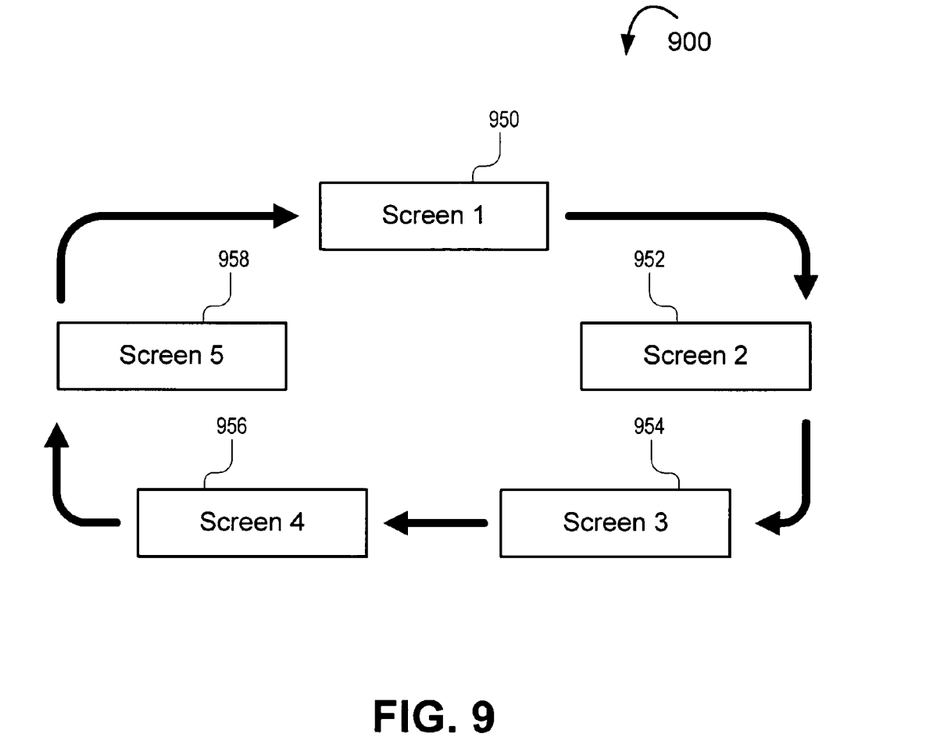
FIG. 9 illustrates, the sequence of available screen types (1–5) for the exemplary Optical Module Reader of FIG. 4.

FIG. 9 illustrates a block diagram 900 of a pictorial sequence of 5 screen displays available on the display 11 of an exemplary embodiment of the Optical Module Reader 10. FIG. 9 shows the uni-direction display sequence and wrap around feature of screen types. FIG. 9 shows 5 screen types: Screen 1 950, Screen 2 952, Screen 3 954, Screen 4 956, Screen 5 958. Each touch of the user button 12 advances one screen. The sequence of screen advancement is as follows: Screen 1 950=>Screen 2 952=>Screen 3 954=>Screen 4 956=>Screen 5 958=>Screen 1 950. Each Screen display type 950, 952, 954, 956, 958 provides 2 lines of SFP/XFP data.

Figure 10:
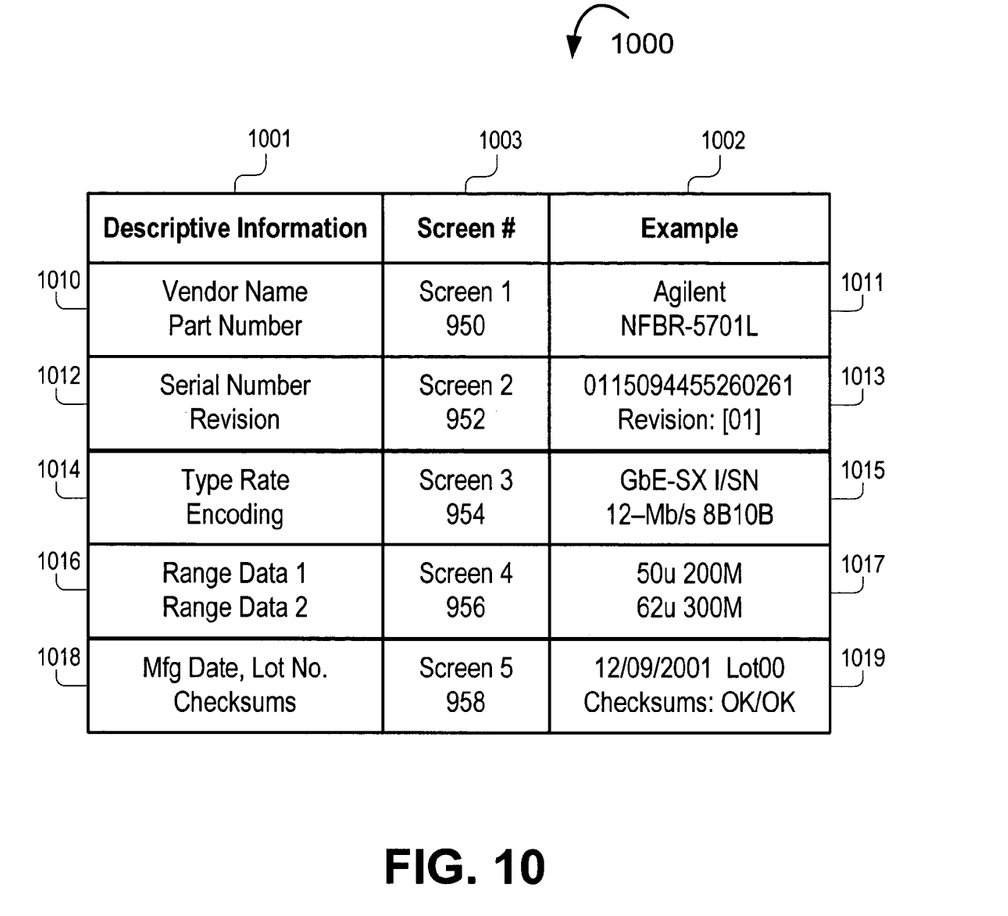
FIG. 10 describes and provides examples of the appearance of the Optical Module Reader's display screen for each of the available screen types (1–5).

FIG. 10 provides a table 1000 with a description and example for each of the 5 screen types: Screen 1 950, Screen 2 952, Screen 3 954, Screen 4 956, and Screen 5 958. Center column 1003 of FIG. 10 lists Screen #, which is the screen reference number or screen type. Left column 1001 of FIG. 10 explains information shown in each row. Right column 1002 of FIG. 10 shows exemplary information displayed on the two lines of the screen of Optical Reader Module Device 10 for each of the 5 screen types.

Referring to the first row of FIG. 10, Screen 1 950 descriptive information 1010 includes a first line with Vendor Name and a second line with Part Number. The Vendor Name lists the inserted module manufacturer and may be displayed as an alphanumeric character sequence of up to 16 characters. The part number displayed is a manufacturer-assigned part number, up to 16 alphanumeric characters. Typically the two lines of screen 1 950 are also printed on the cover of the SFP/XFP optical module that is inserted into Optical Reader Module Device 10. An example of Screen 1 1011 is included as line 1: Vendor=Agilent, line 2 Part Number=HFBR-5701L.

Referring to the second row of FIG. 10, Screen 2 952 descriptive information 1012 includes a first line with Serial Number and a second line with Revision. The Serial Number lists a unique manufacturer-assigned identification number and may be displayed as an alphanumeric character sequence of up to 16 characters. The Revision Number displayed is an optical module revision number, up to 2 alphanumeric characters. Note: the revision number is not always programmed into the optical module, and in such a case, NA shall be displayed. An example of Screen 2 1013 is included with line 1: Serial Number=XXXXXXXXXXXXXXXX, line 2 Revision=Revision: [01].

Referring to the third row of FIG. 10, Screen 3 954 descriptive information 1014 includes a first line with Transceiver Type information and a second line with Rate and Encoding information. The Transceiver Type is provided on the first line and may include Protocol-related rate, reach, and mode characteristics and may be displayed as an alphanumeric character sequence of up to 16 characters. The second line includes signaling rate and encoding type information, where the maximum signaling rate is displayed as a first character sequence of up to 8 alphanumeric characters, and the encoding is displayed as a second character sequence of up to 5 alphanumeric characters. An example of Screen 3 1015 is included with line 1: Transceiver Type=GbE-SX I/SN, line 2 Rate Encoding=1200 Mb/s 8B10B.

Referring to the fourth row of FIG. 10, Screen 4 956 descriptive information 1016 includes a first line with Range Data 1 information and a second line with Range Data 2 information. Range 1 is provided on the first line and Range 2 is provided on the second line, and each line may be displayed as an alphanumeric character sequence of up to 16 characters. For single mode transmitters, a maximum range will be provided on line 1 for Range 1 and no data is shown on line 2 for Range 2. For multimode transmitters, the maximum range on 50 um fiber is shown on line 1 for Range 1 and the maximum range for 62.5 um fiber is shown on line 2 for Range 2; each line may be displayed as an alphanumeric character sequence of up to 16 alphanumeric characters. An example of Screen 4 1017 is included with line 1: 50 um 200M, line 2: 62 u 300M, indicating that a multimode transmitter module has been inserted into Reader 10 with maximum ranges of 200M for 50 um fiber and 300M for 62.5 um fiber.

Referring to the fifth row of FIG. 10, Screen 5 958 descriptive information 1018 includes a first line with Manufacturer date and Lot Number information and a second line with Checksum information. On the first line, the manufacturer date is listed in up to 10 alphanumeric characters using the format MM/DD/YY. The Manufacturer Lot number is listed as up to two alphanumeric characters. The lot may not always be programmed into an optical module, and in such cases, NA shall be displayed. The second line provides a test on the internal memory of the optical devices under test. SFP internal memory is divided into two zones, each with a preprogrammed checksum. The memory is read, the checksum is computed, and the resultant checksum is compared with the programmed checksum. If the checksum matches, "OK" is displayed; otherwise "FA" is displayed indicating a failure. An example of Screen 5 1019 is included with line 1: Mfg Date, Lot No.=Dec. 9, 2001 Lot00, line 2 Checksums=Checksums OK/OK.

Figure 11:
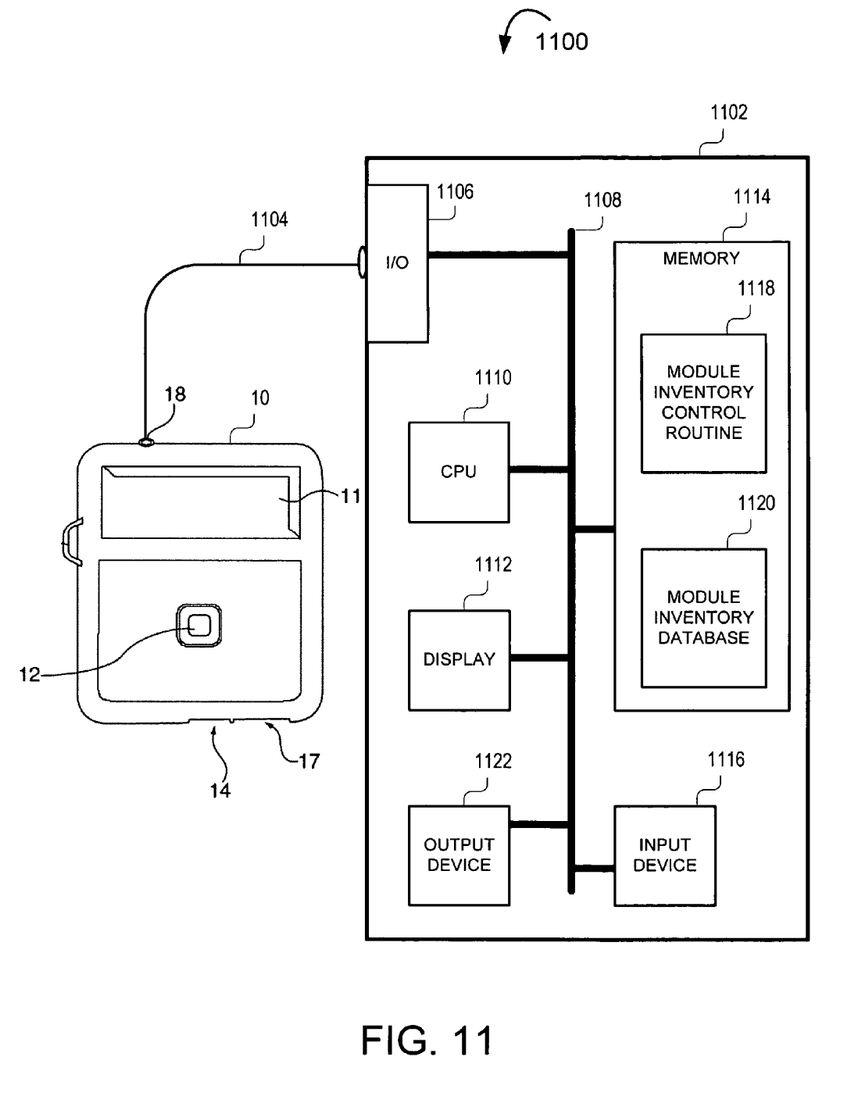
FIG. 11 illustrates an exemplary Optical Module Reading Device Inventory System including an Optical Module Reader of FIG. 4 and a computer which uses the methods of the present invention.

FIG. 11 illustrates an exemplary system 1100 in accordance with the present invention. System 1100 may be used to perform inventory control functions and other operations relating to optical modules. System 1100 includes Optical Reader Module Device 10 coupled to a computer 1102 via an interface cable 1104. The interface cable 1104 may be, e.g., a RS232 serial interface port cable. The computer 1102 may include a processor 1110, e.g., CPU, a display 1112, e.g. CRT or flat screen display, an input device 1116, e.g, keyboard, mouse, keypad, an output device 1122, e.g. printer, an input/output interface 1106, e.g, serial port, and memory 1114. The various elements CPU 1110, display 1112, output device 1122, input device 1116, I/O interface 1106, and memory 1114 are coupled together via bus 1108 over which the elements can exchange information and data. Memory 1114 includes a module inventory control routine 1118 and a module inventory data base 1120. The CPU 1110 executes the routines in memory 1114 to control the operation of the system 1100 and implement the various features and methods of the present invention. The module inventory control routine 1118 supports at least two modes of operation. Modes may be selected by operator interaction through input device 1116. When in an add to inventory mode, each time a user inserts a new optical module into the Optical Module Reader 10, optical module information is conveyed through serial port 18 over cable 1104 and through I/O interface 1106 so that the computer's inventory control routine 1118 can update the information in the module inventory data base 1120. When the system 1100 is in a remove from inventory mode, each time an optical module is inserted into the Optical Module Reader 10, the information conveyed can be used to remove the module from the list of modules in the module inventory data base 1120. Other possible modes of operation may include a display mode, where an unknown module is inserted in the Optical Module Reader 10 and the computer 1102 displays the available characteristic information of the module on the display device 1112 and offers an option for a printout on the output device 1122. Another possible mode of operation may include a matching mode, where a used optical device is inserted into the Optical Module Reader 10, and the inventory control routine 1118 identifies the optical module, searches the inventory data base 1120 for an identical or substitute modules that is available in stock and may be used and issues a report to the user.

Various features and aspects of the present invention may be implemented as hardware, e.g., processor chip, memory devices, software, e.g., routines, or as a combination of hardware and software in accordance with various embodiments of the invention.

While various embodiments of the optical module reader of the present invention have been described as showing five different screens of information, it is to be understood that the present invention is not limited to a particular number of display screens. As newer optical modules are programmed to include additional information than is currently available, the number of display screens supported by the present invention may be increased and/or the amount of information displayed may be increased.

While the invention has been particularly shown and described with reference to the various embodiments thereof, it will be understood by those skilled in the art that various changes in form and detail, may be made therein without departing from the spirit and scope of the invention.

What is claimed is:

1. An apparatus for use with optical modules, said apparatus comprising:
    a portable housing;
    a display device mounted in said housing, the display device including a display having a display area of less than 25 square inches in size;
    an optical module interface mounted in said housing for receiving optical modules to be read;
    a processor coupled to said optical module interface and said display for obtaining information read from optical modules inserted into said interface and for causing said processor to display at least some information obtained from reading an inserted optical module; and
    a user input device coupled to said processor, the user input device being responsive to user input and providing signals to said processor which cause said processor to display different portions of information read from said inserted optical module.

2. The apparatus of claim 1, wherein said user input device includes less than 5 buttons.

3. The apparatus of claim 2, wherein said user input device includes a single button and wherein said processor causes the display device to change the information on the display device, while an optical module is inserted into said interface, each time said button is depressed.

4. The apparatus of claim 1, wherein said optical module interface includes at least two different ports, each of said two different ports accepting a different type of optical module.

5. The apparatus of claim 4, wherein each of said ports includes connecters for providing power to an inserted optical module and for receiving information stored in said optical module from the inserted optical module.

6. The apparatus of claim 1 wherein said display device is an liquid crystal display which supports less than 5 lines of text.

7. The apparatus of claim 6, wherein said display device supports 2 lines of text.

8. The apparatus of claim 6, further comprising:
    memory including instructions for controlling said processor to processing information retrieved from inserted optical modules and to display at least a portion of said information on the display device.

9. The apparatus of claim 8, further comprising a mechanical loop connected to said housing, said loop having sufficient structural integrity to support said apparatus when hung from said loop.

10. The apparatus of claim 9, wherein said loop is molded into said housing and is connected to said housing by the same material from which said housing is formed.

11. The apparatus of claim 9, wherein said housing is made of plastic and wherein said housing and elements included therein weigh in total less than 9 ounces.

12. The apparatus of claim 11, wherein said housing is less than 6"×5"×4" in size.

13. The apparatus of claim 1, wherein the total weight of said housing is less than 6 ounces.

14. The apparatus of claim 13, wherein said housing is made of material have sufficient structural integrity that the housing is capable of being dropped on a concrete floor from a height of 3 feet without breaking.

15. The apparatus of claim 1, further comprising:
    a data port coupled to said processor for outputting data to another computer device.

16. The apparatus of claim 15, wherein said data port is a serial data port.

17. The apparatus of claim 15, wherein said processor outputs information read from each inserted optical module to said data port.

18. The apparatus of claim 1,
    wherein said housing includes an attachment point for receiving a clip which is used to secure said apparatus to a belt; and
    wherein said apparatus includes a battery for powering said processor and said display.

19. A system for creating and maintaining an inventory of optical modules, the system comprising:
    a portable optical module reader including:
        i) an optical module port for receiving optical modules; and
        ii) a data port for outputting optical module information obtained from an optical module inserted into said optical module port; and
    a computer system, coupled to said data port for receiving information read from optical modules inserted into said optical module port, said computer system including:
    memory for storing optical module inventory information; and
    a routine for updating said stored optical module inventory information using information obtained from said data port.

20. The system of claim 19, wherein said routine for updating stored optical module inventory information operates in at least one of two modes of operation, during a first mode of operation said routine adding to said inventory optical module inventory information, information identifying each optical module sequentially inserted into said optical module port.

21. The system of claim 20, wherein said routine for updating stored optical module inventory information, during a second mode of operation deletes from said optical module inventory information, information identifying each optical module sequentially inserted into said optical module port.

22. An optical module inventory management method comprising the steps of:
   securing an optical module reader by a cable to a computer system;
   during a first period of time, sequentially inserting a plurality of optical modules into said optical module reader; and
   operating said computer system to add information obtained from said optical module reader identifying each optical module inserted during said first period of time, to an optical module inventory database.

23. The method of claim 22, further comprising:
   during a second period of time, sequentially inserting a plurality of optical modules into said optical module reader; and
   operating said computer system to delete information obtained from said optical module reader identifying each optical module inserted during said first period of time, from said optical module inventory database.

* * * * *